April 12, 1927.                    1,624,615
T. MIDGLEY
METHOD OF MAKING TIRE CASINGS
Filed June 17, 1921        2 Sheets-Sheet 1
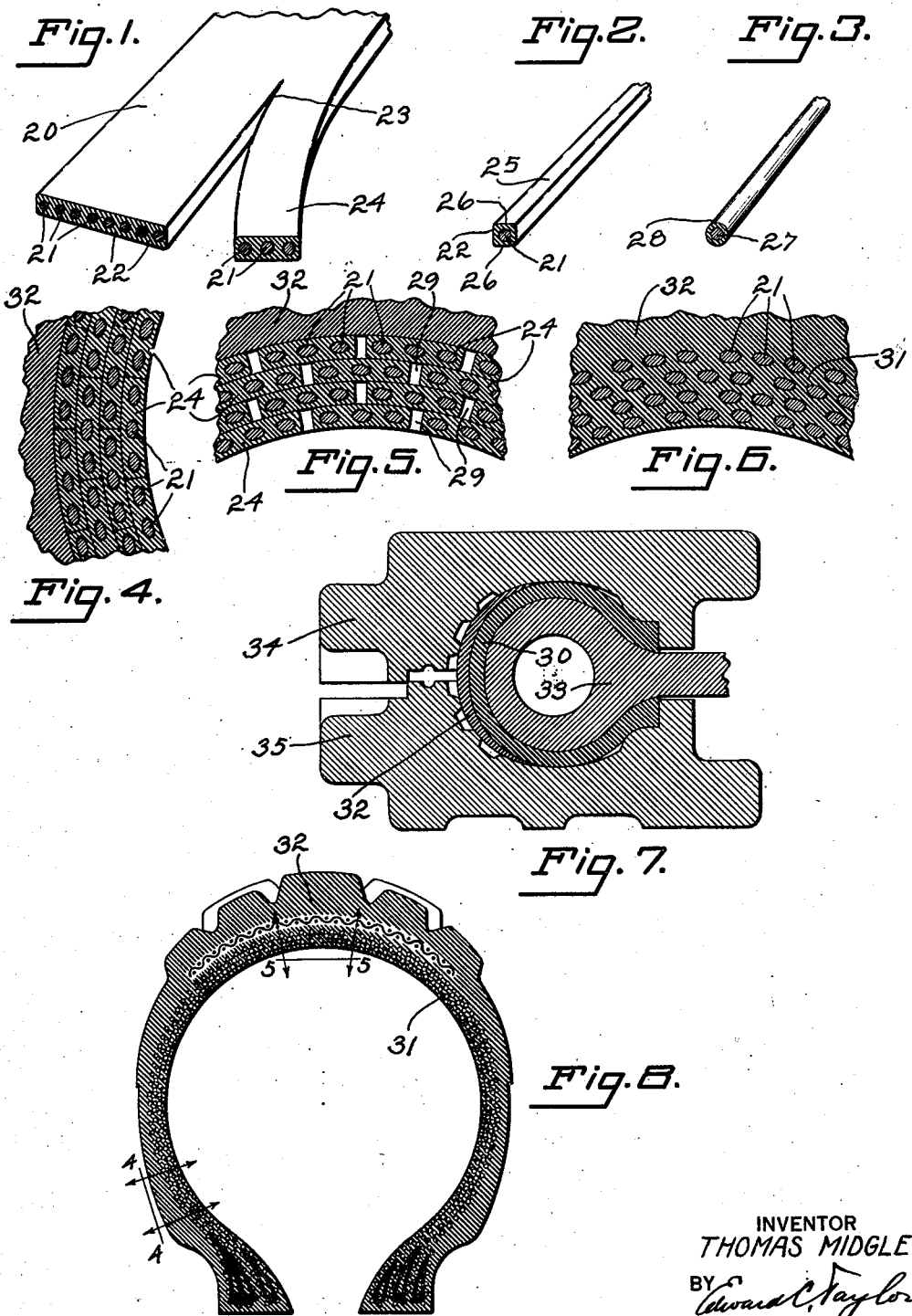
INVENTOR
THOMAS MIDGLEY
BY
ATTORNEY

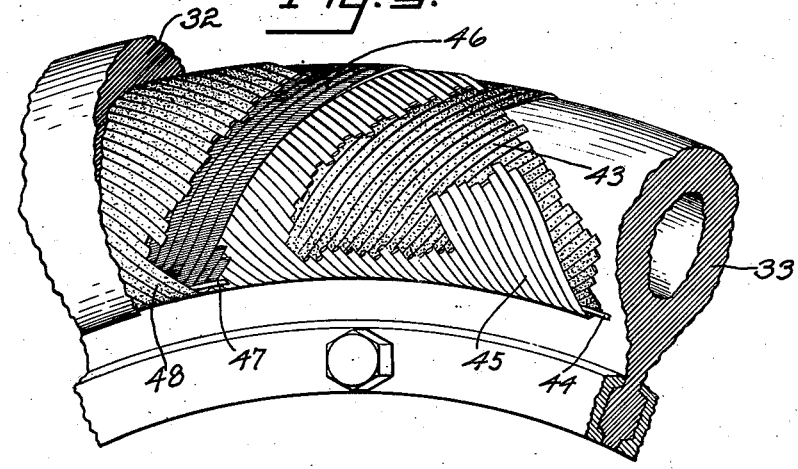
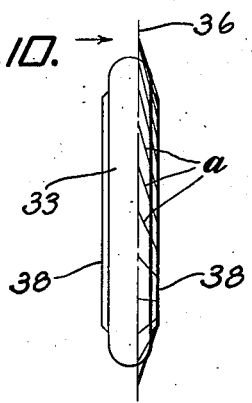
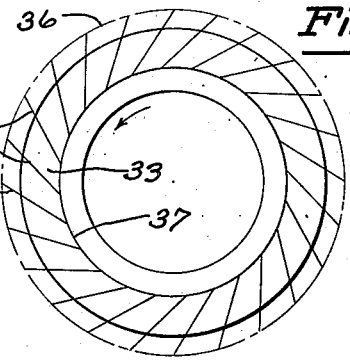
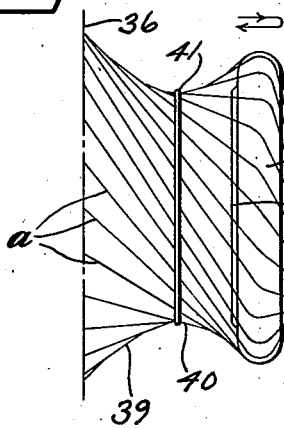
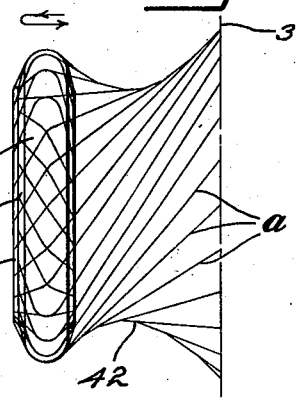

Patented Apr. 12, 1927.

1,624,615

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING TIRE CASINGS.

Application filed June 17, 1921. Serial No. 478,303.

My invention relates to a method by which pneumatic tire casings of the cord type may be constructed in a more expeditious and better manner than heretofore.

Ever since the introduction of tire casings of the cord type, by which I mean casings in which the strain resisting elements are in the form of layers of parallel cords as opposed to woven fabric, it has been recognized that due to the toric shape of a tire casing a series of cords that would completely fill the circumference of the casing at the bead line would normally leave spaces between them at the tread portion of the casing. This will be quite clear upon a realization that the circumference at the bead line of a 35 x 5 tire casing is approximately 79 inches, while the circumference at the crest of the carcass is approximately 109 inches. If the cords are laid in abutting relation at the bead line there is at the tread a surplus space of 30 inches which represents the sum of all the small spaces between adjacent cords along the tread circumference.

Four main methods of closing this space have been proposed, each method being subject to certain objections or inherent difficulties which are overcome by the use of my present invention. By one prior method flattened cords were used, which were twisted about their axes during the laying operation so that they were laid flat on the core at the tread portion but on edge at the bead, the cords changing progressively from one position to the other as they extended from the tread to the bead. By a second method cords of varying cross-section were employed, these cords being of maximum width where they were to pass over the tread, and of minimum width where they entered the bead. By a third method a single cord was laid back and forth across the casing so that successive courses laid side by side at the tread and passed over each other to form two plies at the bead. By a fourth method the cords were laid across the core leaving spaces between the cords at the tread, a sheet of uncured rubber laid over the cords, and this superposed layer of rubber forced between the cords by pressure.

The first three of these methods are based upon a desire to prevent the formation of spaces between adjacent cords by causing the cords themselves to completely cover the surface of the building core, whereas the fourth method aims to close the spaces by rubber. I believe it to be desirable to have spaces which are closed by rubber, forming riveting tongues or projections of rubber extending between plies and securely anchoring the laminated carcass together. Accordingly, my invention is directed to a method of building tire casings by which these rubber rivets between cords will be formed, but by which not only will the building up of the tire carcass be greatly facilitated, but also the carcass will be constructed much more accurately and under better conditions to insure long wearing qualities. Furthermore, by closing the spaces between cords with rubber rather than attempting to cause the cords themselves to fill all the space several inherent disadvantages of the first three prior methods mentioned above are avoided. Where a flat cord is twisted during its course across the tire, for example, there is both great difficulty in accurately positioning and rotating the cords, and there are points at the sides of the tire where the cords extend diagonally, or half-way between their flat and their on-end positions. At these intermediate positions it is much more difficult to position the cords accurately than where they lie flat upon the core. As another example, the shaping of cords to cross sections varying throughout their lengths is a very expensive operation which it is difficult to perform with sufficient accuracy. There is also much waste fabric in tires constructed out of such cords, as the strength of the cord is measured by its least area, and all else is surplusage. As a still further illustration, tire casings built up of cords placed side by side at the tread but in pairs, one over the other, at the bead, are objectionable because of the great stiffening of the tire casing at the bead especially when tires having a large number of plies are to be made.

Having in mind these and other disadvantages inherent in prior cord tire structures, I have devised a method of building such tires which both avoids these difficulties and improves the quality of the tire. This method finds particular utility in connection with the preferred form of cord building element and in the practice of a preferred method of laying the elements. It will be understood, however, that the method is in its broader aspects independent of these preferred elements and methods. Both the broad and the preferred embodiments of the invention will be pointed out in the appended claim.

My invention will now be described in connection with the accompanying drawings, in which:

Fig. 1 is a perspective view of a sheet containing a plurality of cords embedded in rubber, and illustrating the preferred manner of forming a building element for the practice of my invention;

Fig. 2 is a perspective view of a building element formed in the manner indicated in Fig. 1 but composed of only a single cord;

Fig. 3 is a perspective view of a cord surrounded by a cylindrical coating of rubber;

Fig. 4 is an enlarged cross-sectional detail of a portion of the side wall of a tire casing constructed according to my improved method, taken approximately on line 4—4 of Fig. 8, and showing the condition of the elements prior to the application of a molding and compacting pressure;

Fig. 5 is a detail similar to Fig. 4, but showing the disposition of the elements adjacent the crest or tread portion of the casing, taken approximately on line 5—5 of Fig. 8;

Fig. 6 is a detail similar to Fig. 5, but showing the effect of the molding and compacting pressure;

Fig. 7 is a cross-sectional detail showing one method of applying the molding and compacting pressure;

Fig. 8 is a cross-section of the completed casing;

Fig. 9 is a fragmentary side elevation, partly broken away, of the tire casing shown in section in Fig. 8; and Figs. 10 to 14 inclusive, are diagrammatic views showing successive steps in a method of laying the cord elements in connection with which my present invention is preferably employed.

I will commence the description of my invention by referring to the preferred form of building element which I employ. Fig. 1 shows a portion of a sheet 20 composed of a plurality of longitudinal cords 21 embedded in a matrix of rubber 22. This matrix not only extends between the cords but furnishes a coating at one or both of the flat surfaces of the sheet which is greater than that desired for the separation of the cords in the finished tire, for a purpose to be described. My preferred form of building element or cord strip is formed by severing the sheet between adjacent cords as at 23, forming strips 24 including a plurality, three as shown, of the cords 21. This forms a flat strip or band of even thickness which always tends to keep its flat position during the laying operation, and which carries at its flat surface an excess of rubber. In Fig. 2, I have shown a strip 25 also cut from a sheet such as 20 containing only one of the cords 21. The strip so formed also carries an excess of rubber, but cannot be laid with accuracy in a manner to insure that the edges 26 which carry this excess will be always in the same relative position, there being a tendency for the cord to turn over so as to lie on its side if any twisting is given to it. In Fig. 3, I have shown a cord 27 with a round or cylindrical coating of rubber 28 which has been placed thereon as by a solutioning process.

I come now to the reasons which lead to the preference of the relatively wide and flat strip 24 over the other forms. It will be readily understood that there will be a minimum of spaces left between adjacent building elements laid side by side in a tire carcass if these elements as built into the casing are themselves substantially rectangular instead of circular in cross-section. This will be apparent from the analogous case of packing round and rectangular cans in a box. For this reason it is desirable to use a rectangular building element such as 24 or 25 rather than one which is cylindrical as in Fig. 3. The wide strip 24 has material advantages over the narrow strip 25 because of the greater accuracy in positioning it in the carcass, as pointed out above, and because of the fact that in the practical building of a tire carcass there is less difficulty in getting into a definite circumference a given number of cords when these are in the form of relatively wide strips than when they are supplied as single cords. This last fact is due to the necessity in practical tire building operations of allowing some clearance between adjacent elements, this necessity being particularly apparent when the material with which the cords are coated is uncured rubber in a sticky condition. The clearance necessary between adjacent elements is the same whatever the total number of elements, and therefore, if the total number of elements can be reduced by increasing the number of cords incorporated in each element, the total clearance required will be less. In other aspects of the same principle, the number of cords incorporated into a single ply can be increased, or a given number of cords can be laid in a given circumference with greater facility, if the cords are joined together in the form of flat strips. These advantages will be more apparent when the preferred method of laying the cord strips on the tire building core is considered.

Considering now the building of a tire casing out of cord strips such as 24, irrespective of the specific method by which the cords are laid on the core, it will be apparent that with the strips laid close together at the sides of the tire there will be necessarily a slight space between adjacent strips where these strips cross the crest of the casing. This is perhaps best shown in Figs. 4 and 5, the former showing the close relation of the strips adjacent the beads of the tire and the latter showing the spaces 29 which appear between them at the tread. The excess rubber which has previously been provided at the flat surfaces of the strips 24 serves to flow into the spaces 29 to close them when molding pressure is applied, changing the character of the laminated structure 30 forming the carcass of the tire from one honeycombed with spaces between separate strips to a solid matrix of rubber 31 interspersed with cords 21. It would appear at first sight that there would be a greater thickness of rubber between the plies adjacent the sidewalls than at the tread where this rubber flows into the spaces between adjacent cords. Apparently, however, there is an equalization of the rubber between the plies during vulcanization, as I have found from examination of sections of tires made according to this method that there is no appreciable difference in the rubber thickness between plies throughout the tire, due, apparently, to the rubber between the plies adjacent the sidewalls flowing towards the tread. If this equalization of rubber did not take place, however, the tire would not be detrimentally affected, as the slight excess of rubber does not stiffen the walls of the tire but on the contrary gives to the plies freedom of movement one on the other.

The individuality of the strips 24 is by the molding pressure and vulcanizing heat completely destroyed, all the strips blending into a unitary carcass structure. The molding pressure may conveniently be applied by supporting the interior of the carcass 30, now having covering rubber 32 applied to it, upon a rigid core 33 and compressing the assembly against the core by mold sections 34 and 35, as is well understood in the art. Vulcanizing heat may be applied to the casing while so compressed, as is also well understood.

I will now describe briefly the method of laying the cord strips on the building core which I prefer to use in practicing my present invention, and in connection with which I believe my invention to have additional utility. In this method of cord laying, which is described and claimed in my Patents 1,603,856 and 1,603,858, granted October 19, 1926, a circumferential series of cord strips is employed, a sufficient number of strips being taken to form a complete ply. In Figs. 10 to 14 I have shown only twent-four elements and have illustrated these by single lines a rather than as strips 24 as the representation of the method is somewhat simplified by the elimination of unnecessary lines.

The circumferential series of elements a is guided from a circumference 36 in taut condition and initially located and secured adjacent the bead line 37 of the building core, which is preferably the same as the core 33 upon which the casing is vulcanized. Preferably the building core is provided with flanges 38 upon which the bead edges of the carcass structure rest during the building operation. The core and guide are initially arranged in the relative positions shown in Figs. 10 and 11, in which the elements a extend down the side of the core at the angle desired in the tire carcass as built. The core and guide are then axially separated as by moving the core in the direction of the arrow in Fig. 10, relative rotation being given at the same time to the core and guide as by rotating the core in the direction of the arrow in Fig. 11. This combined motion of reciprocation and rotation draws the several elements a taut between points where they cross the crest of the core and the points where they are guided in the circumference 36 in such a manner that they extend at such an angle as to preserve the angular position in which they were laid across the core. The relation of the core, guiding circumference, and building elements is shown in Fig. 12. In this position of the parts the elements bound a curved surface mathematically termed a warped or ruled surface of revolution, each individual element, however, being straight and the curve of the enveloping surface being due to the angularity of all the elements. This curved surface 39 has a constricted portion 40 around which an annular anchorage 41 may be applied.

The core and the guiding circumference are now caused to approach each other in the direction of their common axis, the core being meanwhile rotated in the reverse direction from that shown in the arrow in Fig. 11 so as to preserve the elements in the same angular position and the elements being drawn back in taut condition through the guiding circumference until the anchorage 41 has been carried adjacent the side of the core (Fig. 13). The core and guiding circumference are now axially separated in the reverse direction until they reach the relative positions shown in Fig. 14, the core being meanwhile rotated in the original direction. This reversal of the planes of the core and guiding circumference serves to lay the cords across the core in a second layer, and forms a warped surface 42 whose constricted portion permits of the application of a second anchorage. This reversal can be repeated until the desired number of plies is laid up, an anchoring member being applied at each traverse, all as described more in detail in a copending application.

Considering now the case in which flat strips 24 carrying excess rubber are used for building elements in the laying process above described, it will be seen that the maximum number of strips that can be used is to be determined by the number that can be laid side by side around the anchorage 41, this being the minimum circumference. This condition is also illustrated in Fig. 9, in which a tire casing is shown built up of flat strips laid in the zig-zag manner back and forth across the casing described above. In that figure the first ply of strips is indicated at 43, this ply passing around an annular anchorage 44 to form a second ply 45. This second ply crosses to the opposite side of the carcass, passing under an anchorage (not shown) and back across the carcass to form the third ply 46. This in turn passes around an anchorage 47 and recrosses the carcass as a fourth ply 48.

In a tire casing built as described it is necessary to have a certain amount of clearance between the building elements where they pass around the anchorage, as the elements can never be laid with mathematical precision. If this clearance is not provided the elements will in same places "shingle," or overlap each other, causing undesirable thickness, stiffness, and irregularity adjacent the beads. It is desirable, however, to reduce the clearance as much as possible in order to get as many building elements in the carcass as possible. If, according to my present invention, the cords are formed into flat elements embodying a plurality of cords, the total space used as clearance may be lessened roughly by a factor equal to the number of cords grouped into a single element. Obviously the space between adjacent elements at the tread will be greater than the width of a single element, and for this reason the number of cords incorporated in a single element cannot be increased indefinitely. I prefer, as an example of what will embody my ideas in most convenient form, to use building elements or strips of a width of from one-fourth of an inch to one inch.

With the rubber carrying strips incorporated in the carcass as above described, and the assembly completed by the addition of suitable covering materials such as a tread, side walls, and chafing strips, the assembled casing may be subjected to molding pressure to shape it to its final form, and heat applied to vulcanize it. This will cause the excess rubber carried by the building elements to flow into the spaces between them, and will change the honeycombed structure originally laid up into one having a homogeneous matrix of rubber with spaced cords running through it. A carcass constructed according to the method briefly described in connection with Figs. 10 to 14 is particularly adapted for molding between a rigid core and rigid mold sections, as particularly pointed out in a copending application, and the expensive internal expansion process previously thought necessary for cord tires is dispensed with.

It may be found desirable in some cases to cause the building elements to "shingle" or overlap adjacent the bead, notwithstanding the additional thickness given to the side walls by this manner of construction. My present invention also finds applicability to this case, and the excess rubber carried by the elements will not only fill whatever spaces may exist between adjacent elements at the tread, but will also render homogeneous the shingled structure near the beads.

Having thus described my invention, I claim:

The method of building a tire casing consisting in laminating in plies rubberized building elements carrying an amount of rubber in excess of that required for the normal purpose of the elements and sufficient of itself to fill the spaces between the elements, such elements being located closely adjacent each other near the bead edges of the tire and gradually diverging from one another adjacent the tread portion of the tire, molding the tire under pressure and thereby causing the excess rubber carried by the elements to fill the spaces between the elements, and vulcanizing the tire.

THOMAS MIDGLEY.